United States Patent
Paras Ram et al.

(10) Patent No.: US 12,511,099 B2
(45) Date of Patent: Dec. 30, 2025

(54) SYSTEM AND METHOD FOR ADJUSTING AUDIO ATTRIBUTES FOR OFF-FOCUS AUDIO OF A DEVICE

(71) Applicant: MOTOROLA SOLUTIONS, INC., Chicago, IL (US)

(72) Inventors: Anoop Sehgal Paras Ram, Ipoh (MY); Jonathan Chan, Bukit Mertajam (MY); Chen Hang Chia, Alor Setar (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 273 days.

(21) Appl. No.: 18/458,183

(22) Filed: Aug. 30, 2023

(65) Prior Publication Data
US 2025/0077169 A1 Mar. 6, 2025

(51) Int. Cl.
G06F 3/16 (2006.01)
(52) U.S. Cl.
CPC .................... *G06F 3/165* (2013.01)
(58) Field of Classification Search
CPC ..................................... G06F 3/165
See application file for complete search history.

(56) References Cited

U.S. PATENT DOCUMENTS

| | | | |
|---|---|---|---|
| 10,863,267 B2 | 12/2020 | Silva et al. | |
| 10,868,508 B2 | 12/2020 | Apodaca | |
| 2004/0008852 A1* | 1/2004 | Also | H04H 60/04 381/104 |
| 2004/0201608 A1* | 10/2004 | Ma | H04N 21/4263 715/719 |
| 2006/0291666 A1* | 12/2006 | Ball | G06F 3/165 381/104 |
| 2014/0079247 A1 | 3/2014 | Sanders | |
| 2016/0291929 A1* | 10/2016 | Chen | H03G 3/32 |
| 2017/0134872 A1* | 5/2017 | Silva | G06F 3/04886 |

* cited by examiner

*Primary Examiner* — Joseph Saunders, Jr.

(57) ABSTRACT

Techniques for adjusting audio attributes for off-focus audio of a device are provided. An indication that audio attributes for on-focus audio are being adjusted are received at the device. The indication is received via an audio control of the device. A priority level of an application having the on-focus audio is determined. An event based on the priority level is determined. The audio attributes for on-focus audio are adjusted. The audio attributes for off-focus audio are adjusted upon occurrence of the event.

14 Claims, 5 Drawing Sheets

SYSTEM AND METHOD FOR ADJUSTING AUDIO ATTRIBUTES FOR OFF-FOCUS AUDIO OF A DEVICE

BACKGROUND

The Android™ operating system is widely used in many devices such as smart phones and tablets. Many operating systems, including Android™ have a concept called audio focus. The on-focus audio is the application that is currently in control of audio output of a device. For example, when engaged in a call via the phone application, the on-focus audio is the call. When viewing a video (e.g. YouTube™, etc.), the on-focus audio is the media application. When an incoming call is being received, the on-focus audio is the ringtone. When an alarm goes off, the on-focus audio is the alarm sound.

As the on-focus audio is the application currently in control of the device, there is also the concept of off-focus audio. Off-focus audio is any audio stream that is not currently the on-focus audio. For example, if watching a video using the media application, the call application, the ringtone application, and the alarm application will all be off-focus audio. As should be clear, the on-focus audio and off-focus audio can change depending on what is occurring. For example, if while watching the video, an incoming call is received, the ringer will become the on-focus audio while the media player will become off-focus audio. Upon answering the call, the call audio becomes the on-focus audio. Once the call is completed, the on-focus audio may revert to the media player.

In addition, there is the concept of working output audio. A device, such as smartphone, may have multiple destinations for audio. For example, the device may include an integrated speaker. The device may also be physically coupled to a wired headset. The device may include an earpiece audio output where an earpiece device may be connected. The device may also be wirelessly coupled, via a technology such as Bluetooth™ to a wireless headset. Each audio type (e.g. call, ringtone, media, alarm, etc.) may be assigned to a specific destinations. For example, the ringtone may be routed to the integrated speaker, media audio routed to the wired headset, call audio routed to the wireless headset, and alarm audio routed to the integrated speaker. Outputs that have at least one application that is routing audio to it are referred to as working outputs. All other audio destinations are referred to as remaining outputs.

Typical operation of most devices based on the Android™ operating system is that when the audio controls are actuated, the audio is adjusted for the application that is currently has the on-focus audio. For example, if a video is being viewed with the media application and the volume up control is activated, the volume will only be increased for the media application. The volume for calls, ringtones, and alarms will remain at whatever level they were set to previously. In other words, in typical operation, the audio controls, such as volume, only impact the on-focus audio.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
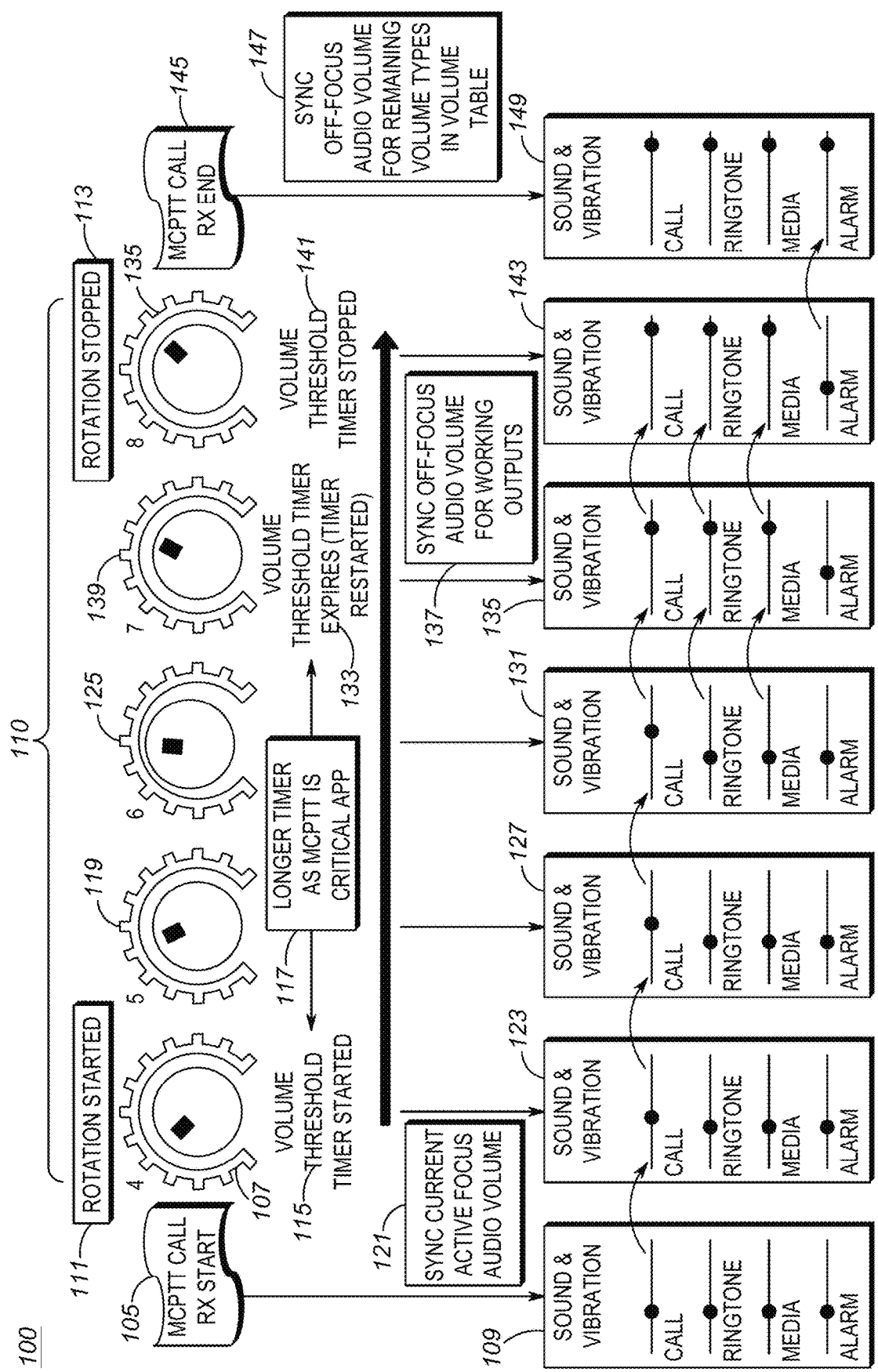
FIG. 1 is an example of adjusting the audio characteristics of a device when a high priority application is running.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

The operation of the audio controls, where the controls only impact the on-focus audio is not always desired. For example, in some cases, the desire may be that the audio controls impact all audio on the device, both on-focus and off-focus. For example, some devices, such as purpose built devices, may not include a display. Thus, unlike a device where the audio level of each type (e.g. call, ringtone, media, alarm, etc.) can be viewed on a display, there is difficult to adjust the audio level when controlled this way.

The desired operation is that when the audio control is actuated, the audio attributes for all output type are changed together. Thus, regardless of which audio currently is the on-focus audio, a change in the attribute for the on-focus audio will cause the same change to the off-focus audio. For example, if while engaged in a call the user turns the volume for the call up to the maximum, the audio volume for the ringtone, media, and alarms will also be changed to the maximum.

A problem arises in the way that many operating systems, including the Android™ operating system handle changes to audio attributes, such as volume. For each pair of audio type (e.g. call, ringtone, media, alarm, etc.) and whether the output is a working output, a system call must be made to set the volume for that pair. Table 1 below shows an example of the possible pairs of audio types and their associated outputs.

TABLE 1

| Volume Type | Audio Output Type | Volume Level |
| --- | --- | --- |
| Call Volume | Device Earpiece | 1 |
| Call Volume | Device Speaker | 5 |
| Call Volume | Wired Headset | 7 |
| Call Volume | Bluetooth SCO | 3 |
| Media Volume | Device Earpiece | 5 |

TABLE 1-continued

| Volume Type | Audio Output Type | Volume Level |
| --- | --- | --- |
| Media Volume | Device Speaker | 2 |
| Media Volume | Wired Headset | 5 |
| Media Volume | Bluetooth A2DP | 8 |
| Media Volume | Bluetooth SCO | 3 |
| Ringer Volume | Device Earpiece | 1 |
| Ringer Volume | Device Speaker | 1 |
| Ringer Volume | Wired Headset | 1 |
| Ringer Volume | Bluetooth A2DP | 1 |
| Ringer Volume | Bluetooth SCO | 9 |
| Notification Volume | Device Earpiece | 6 |
| Notification Volume | Device Speaker | 5 |
| Notification Volume | Wired Headset | 4 |
| Notification Volume | Bluetooth A2DP | 3 |
| Notification Volume | Bluetooth SCO | 9 |

Table 1 is not intended to be exhaustive. As new audio types are added the number of pairs is only expected to increase. As shown, there are nineteen pairs of volume type/audio output type. Every time an audio attribute, such as volume, is changed, there are nineteen system calls that are required. Further exacerbating the problem of excessive system calls is that fact that for each individual step in change in audio attributes, the same system calls must be made. For example, if the volume is changed from level 4 to level 8, that is four individual volume increases (e.g. 4 to 5, 5 to 6, 6 to 7, and 7 to 8). Each increase requires the same nineteen system calls, thus resulting in 76 individual system calls. Although Table 1 includes both working and non-working audio outputs, the system calls must all be made for each audio output, even if non-working, because the device does not know if/when the user may switch to a different audio output for that volume type (e.g. user switches the call volume from the device speaker to the device earpiece).

The issues related to multiple changes in volume level is further exacerbated by the design of some special purpose devices where the volume control is implemented as a volume knob, rather than one or more buttons. It is significantly easier to quickly spin a volume control knob from one position to another (e.g. minimum to maximum) than it is to individually press a button to control an individual step increase. However, the techniques described herein are not dependent on use of a knob. A long press of an audio control button may be viewed as an equivalent of spinning and audio control knob rapidly.

In the present example, assuming the audio attribute can go from 0 to 10, this involves 10 step increases. With nineteen volume type/audio output type pairs, this may require up to 190 system calls that all arrive in a very short period of time. Such a large number of system calls may cause the device, in particular the user interface, to freeze temporarily while the system calls are processed. During this freeze, the device is effectively unusable by the user. This outcome is unacceptable for mission critical applications. For example, public safety first responders (e.g. Police, Fire, Emergency Medical Services, etc.) may utilize Mission Critical Push to Talk (MCPTT) applications to communicate (e.g. provide Land Mobile Radio walkie talkie type functionality on a smartphone like device or purpose built device). MCPTT is a critical service and temporary freezes of the device while the system calls are being processed is unacceptable. If the device is frozen, and a new call is received, the call cannot be processed by the device until it becomes unfrozen. Such a delay may be acceptable when watching a video for entertainment, but is not acceptable when an MCPTT call, where people's lives may be on the line, is received. Thus, there exists a need for an improved technical method, device, and system for adjusting audio attributes for off-focus audio of a device.

The techniques described herein solve this problem, individually and collectively. When an adjustment to audio controls is received (e.g. a change in volume setting, etc.), the current on-focus audio volume is adjusted immediately. The device then inserts a delay before adjusting the audio settings for off-focus audio. In some implementations, the device first adjusts audio settings for the off-focus working outputs. After an additional delay, the device adjusts the audio settings for off-focus non-working outputs.

In some implementations, the delay is based on the on-focus audio losing focus. For example, if the user is engaged in a call, the on-focus audio is the call. Any adjustments to off-focus audio settings may be delayed until the call completes. In another implementation, the change in audio settings causes a timer to be started. The length of the timer may be determined by the priority level of the application that currently has the audio focus. The higher the priority level of the application with the audio-focus, the longer the timer may be.

The on-focus audio settings may be updated immediately. Upon expiration of the timer, the off-focus audio settings may be adjusted. The reason the time is longer for higher priority applications is that this reduces the chances that the system calls for adjusting the off-focus audio settings would be received in rapid succession, potentially causing the device to freeze. The timer for lower priority applications having the audio focus may be reduced, because even if the lower priority application freezes momentarily, such behavior is likely acceptable, as the lower priority application is not mission critical.

A method of adjusting audio attributes for off-focus audio of a device is provided. The method includes receiving, at the device, an indication that audio attributes for on-focus audio are being adjusted, the indication received via an audio control of the device. The method also includes determining a priority level of an application having the on-focus audio. The method also includes determining an event based on the priority level. The method also includes adjusting the audio attributes for on-focus audio. The method also includes adjusting the audio attributes for off-focus audio upon occurrence of the event.

In one aspect of the method, the event is a timer further comprising starting the timer based on the priority level and adjusting the audio attributes for off-focus audio upon expiration of the timer. In one aspect of the method, adjusting the audio attributes for off-focus audio further comprises adjusting the audio attributes for off-focus audio to match the audio attributes for on-focus audio. In one aspect, the method further comprises detecting a peripheral device has been connected to the device and adjusting audio attributes for the peripheral device off focus audio to match the attributes for on-focus audio on the device.

A system for adjusting audio attributes for off-focus audio of a device is provided. The system includes a processor and a memory coupled to the processor. The memory containing a set of instructions thereon that when executed by the processor cause the processor to receive, at the device, an indication that audio attributes for on-focus audio are being adjusted, the indication received via an audio control of the device. The memory further contains instructions that cause the processor to determine a priority level of an application having the on-focus audio. The memory further contains instructions that cause the processor to determine an event based on the priority level. The memory further contains instructions that cause the processor to adjust the audio attributes for on-focus audio. The memory further contains instructions that cause the processor to adjust the audio attributes for off-focus audio upon occurrence of the event.

In one aspect, the event is a timer and the memory further contains instructions that cause the processor to start the timer based on the priority level and adjust the audio attributes for off-focus audio upon expiration of the timer. In one aspect, adjusting the audio attributes for off-focus audio further comprises instructions to adjust the audio attributes for off-focus audio to match the audio attributes for on-focus audio.

A non-transitory processor readable medium containing a set of instructions thereon for adjusting audio attributes for off-focus audio of a device is provided. The instructions, that when executed by a processor cause the processor to receive, at the device, an indication that audio attributes for on-focus audio are being adjusted, the indication received via an audio control of the device. The instructions on the medium further contain instructions that cause the processor to determine a priority level of an application having the on-focus audio. The instructions on the medium further contain instructions that cause the processor to determine an event based on the priority level. The instructions on the medium further contain instructions that cause the processor to adjust the audio attributes for on-focus audio. The instructions on the medium further contains instructions that cause the processor to adjust the audio attributes for off-focus audio upon occurrence of the event.

In one aspect, the event is a timer and the instructions on the medium further contain instructions that cause the processor to start the timer based on the priority level and adjust the audio attributes for off-focus audio upon expiration of the timer. In one aspect, adjusting the audio attributes for off-focus audio further comprises instructions on the medium to adjust the audio attributes for off-focus audio to match the audio attributes for on-focus audio.

In one aspect, the audio control is a volume knob. In one aspect, the audio attribute is a volume level. In one aspect, the higher the priority level of the application the longer the timer. In one aspect, the event is the on-focus audio being released.

Further advantages and features consistent with this disclosure will be set forth in the following detailed description, with reference to the figures.

Figure 5:
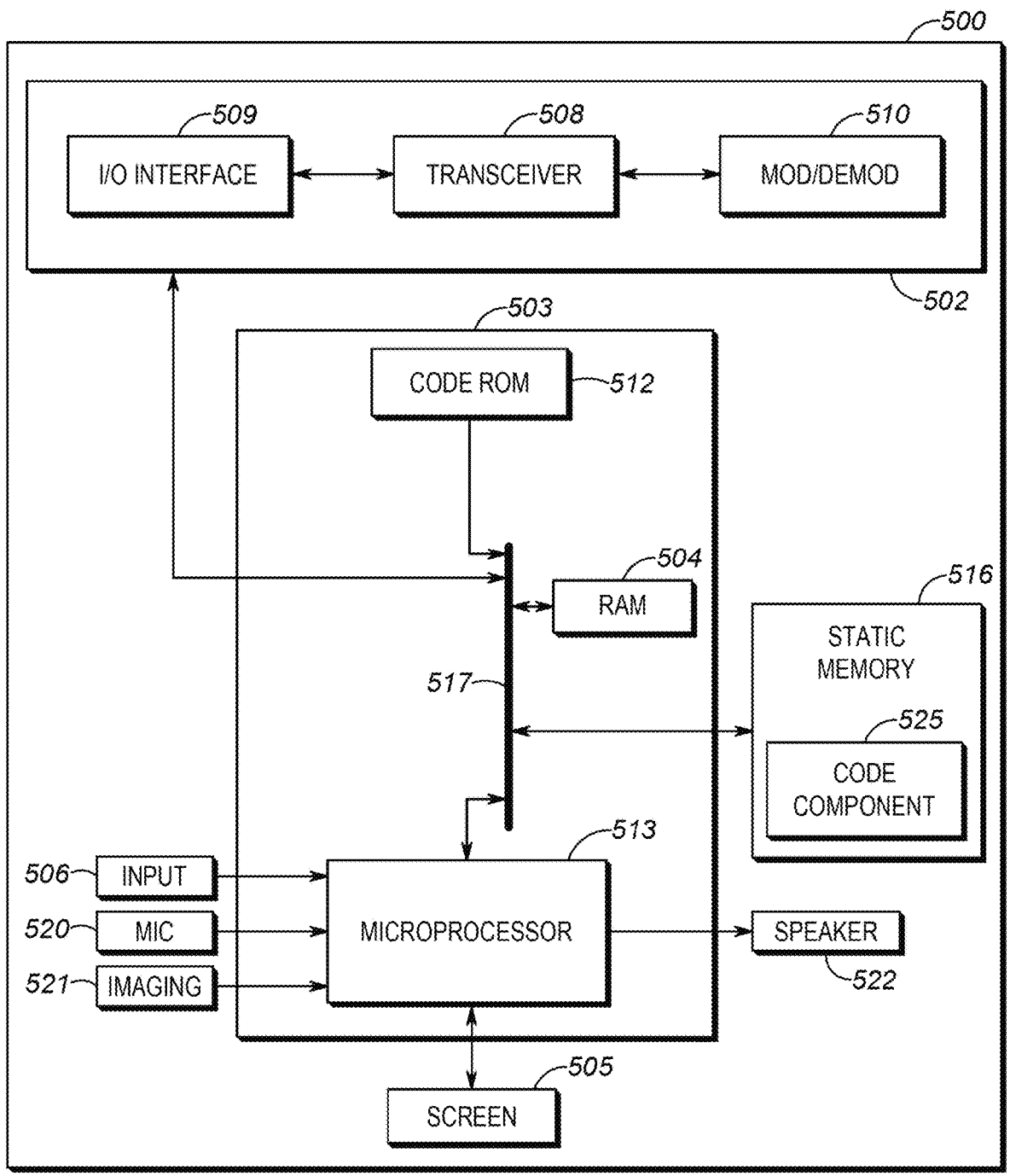
FIG. 5 is an example of a device that may implement the adjusting audio attributes for off-focus audio of a device according to the techniques described herein.

FIG. 1 is an example of adjusting the audio characteristics of a device 100 when a high priority application is running. An example of an implementation of device 100 is depicted in FIG. 5. The device may include an audio adjustment control. As shown, the audio adjustment control is a volume knob 110. It should be understood that the depiction is FIG. 1 represents a volume control knob being rotated from a volume level of 4 to a volume level of 8 (e.g. 4 steps of adjustment) and is not intended to imply there are 5 separate audio controls.

Although the audio control is depicted as a knob, it should be understood that the techniques described herein are not limited to knobs. The techniques are equally applicable to other types of audio controls, such as up/down buttons, or any other type of control. In addition, although the audio attribute that is being changed will be described in terms of the attribute being a volume, it should be understood that the techniques described herein could be used with any attribute, not just volume. The use of volume is for ease of description, and not by way of limitation. Other attributes could include sound quality (bass, treble, etc.), fader, other call related parameters, etc.

In operation, the user may begin a MCPTT call 105 with the volume level of the call being set to four 107. As should be clear, because the user is engaged in a MCPTT call, the current on-focus audio would be the call as depicted by the star in the initial sound and vibration settings 109. The off-focus audio would be the ringtone, media, and alarm sounds. It should be noted that the Sound & Vibration elements shown in FIG. 1 may not actually be displayed to the user, but rather represent the audio output settings as may be stored in the device internally. As mentioned above, the device need not have a display.

At some point in time, the user may start rotating 111 the volume knob. In the example shown, the user rotates the volume knob from level four to level eight 113. It should be understood that this adjustment could occur very quickly (e.g. the user rapidly spins the adjustment knob.). In response to the volume knob being adjusted, the device may start a timer 115, referred to as the volume threshold timer. There will be no adjustment to the off-focus audio until the timer has expired. The priority level of the MCPTT application is determined to be high, because it is a mission critical application. As such the length of the timer is longer 117, because the application is critical.

As shown, the user rotates the volume knob from level four 107 to level five 119. This causes the on-focus audio (e.g. the call) to sync to the current volume level setting (e.g. level five) as shown in Sound and Vibration settings 123. The off-focus audio volume settings are not changed. The user then rotates the volume control knob from level five 119 to level six 125. A shown in the Sound and Vibration settings 127, the on-focus audio setting is changed. Since the timer has not yet expired, the off-focus audio settings remain the same.

The user may then rotate the volume knob from level six 125 to level seven 129. As shown in Sound and Vibration settings 131, this causes the on-focus audio (e.g. the call audio) to be set to level seven. Again, since the timer has not expired, the audio setting for the off-focus audio are not changed. At some point, the volume threshold timer expires 133. This causes the audio settings for the off-focus audio outputs to be adjusted, as shown in Sound and Vibration settings 135. In some implementations, only the working outputs are adjusted 137. In those cases, the timer may then be restarted. In the example shown, the alarm audio setting is not considered a working output, and as such, the volume level for the alarm audio is not shown as adjusted in Sound and Vibration settings 135.

What should be noted is that the off-focus audio settings were not adjusted until the timer expired 133. When the timer does expire, the off-focus audio settings are adjusted to the current position of the audio control. As such, the system calls to increase the volume level of the off-focus audio from level four to level five, from level five to level six, and from level six to level seven, are essentially skipped until the timer expires. By eliminating these system calls, it is less likely that the device will freeze due to excessive system calls to adjust the audio setting of off-focus audio.

The user may then rotate the volume knob to level eight 139 and stop rotating the volume knob 113. At some point, the volume threshold timer that was restarted expires 141 and is stopped. The audio settings for the off-focus audio are then adjusted, as shown by Sound and Vibration settings 143.

At some point, the MCPTT call may end and as such the ring audio will no longer be the on-focus audio. At this point, the audio settings for all the remaining volume types (e.g. the non-working outputs) may be synchronized 147 with the audio control (e.g. the volume knob). This synchronization is shown in Sound and Vibration settings 149, where the alarm volume setting is synchronized with the current position of the volume knob. What should be understood is that by waiting until the MCPTT call was over before synching the off-focus, non-working outputs, all the system calls to adjust the volume for those outputs from level four to five, from five to six, and from six to seven were avoided. There was only one set of system calls required to set the volume to level eight, thus bypassing all of those intermediary system calls.

Although not shown, there may be situations where the audio output setting for a currently non-working audio setting is immediately updated. For example, if the current working output for a call is the device's integrated speaker, a wired headset may be considered a non-working audio output. However, if the user re-routes audio from the integrated speaker to the wired headset, the wired headset becomes the working output. As such, the audio settings for that particular pairing (e.g. ring audio type/wired headset) would be immediately updated. Similarly, if a new peripheral is detected (e.g. Bluetooth headset paired, etc.) the audio settings for that peripheral may be updated immediately when the on-focus audio is directed to that peripheral.

Figure 2:
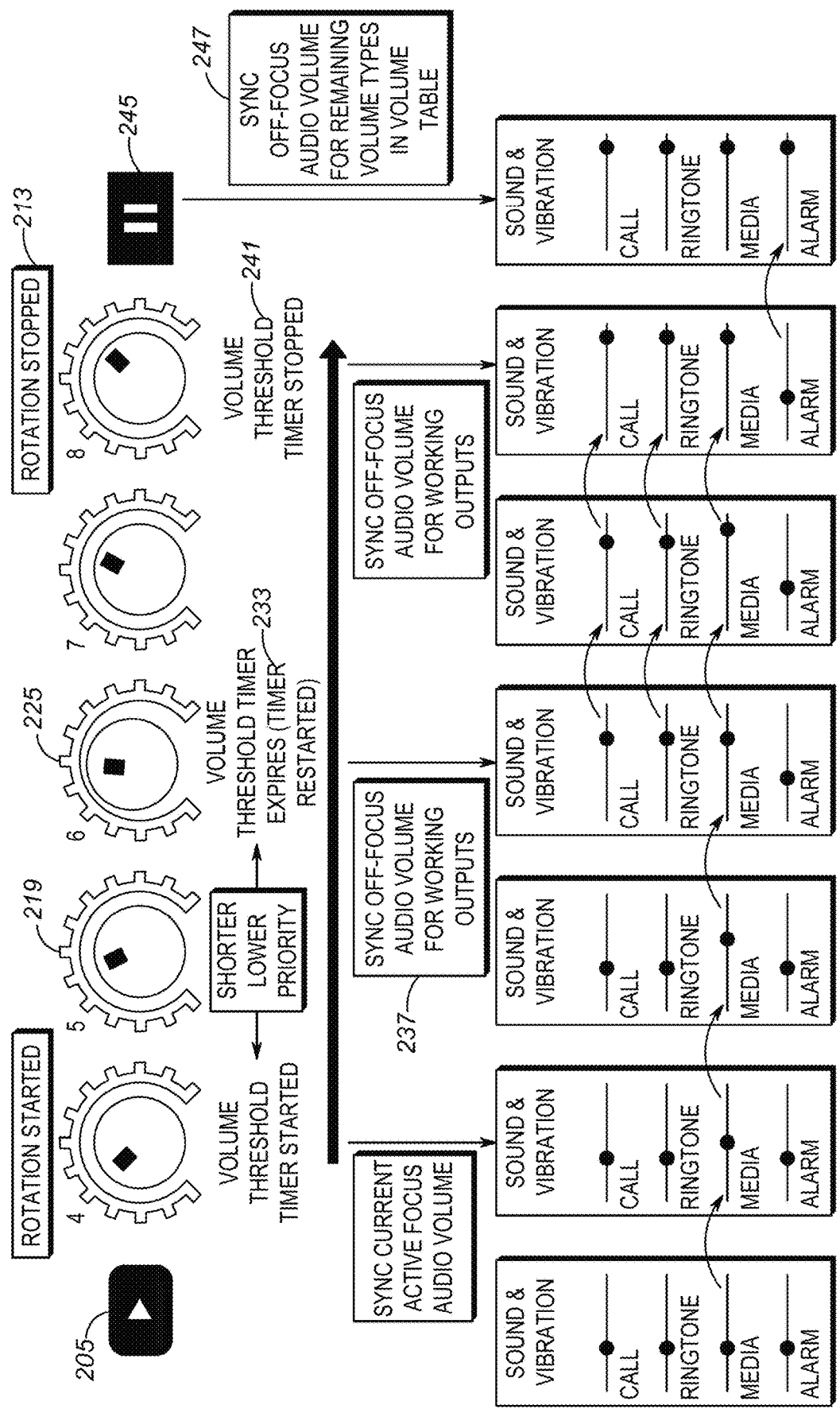
FIG. 2 is an example of adjusting the audio characteristics of a device when a lower priority application is running.

FIG. 2 is an example of adjusting the audio characteristics of a device 200 when a lower priority application is running. The device 200 and operation shown in FIG. 2 is essentially the equivalent of what was shown in FIG. 1, with the exception that in the example shown in FIG. 2, the application 205 that is running is a lower priority application, such as a media application (e.g. YouTube™). As such, the majority of the steps in FIG. 2 are exactly the same as those shown in FIG. 1.

The main exception is the length of the timer. Because the application with the on-focus audio is of lower priority, the device freezing may be somewhat acceptable. As such, the length of the timer may be adjusted to be shorter. As shown, the timer expires 233 after the volume has been changed from level five 219 to level six 225. Upon expiration of the timer, the off-focus audio is then synched 237 with the current position of the audio knob 225. The timer is then restarted. Upon the user stopping rotating the volume knob 213, the volume threshold timer is stopped 241 and the off-focus audio settings are synched with the volume knob. Just as above, in some implementations, once the on-focus audio has released the audio (e.g. the video being viewed in the media player has finished) 245 the off-focus non-working audio outputs may be synched 247 to the volume knob.

It should be noted by using a shorter timer, it is easier to keep the audio settings for all the audio types in sync. For example, if a call came in while the media was playing, it would take less time for the volume of the call to be synched for the incoming call. For example, when changing the volume from level four to level 6, the synching occurred at volume level 6. Thus if a call came in at a point just prior to the volume knob being set to level seven, the volume would already be pretty close to the actual position of the volume knob. This is unlike the example in FIG. 1, where if a call came in just prior to the volume knob being set to level seven, the current volume for the ring audio would still be set at level four.

Figure 3:
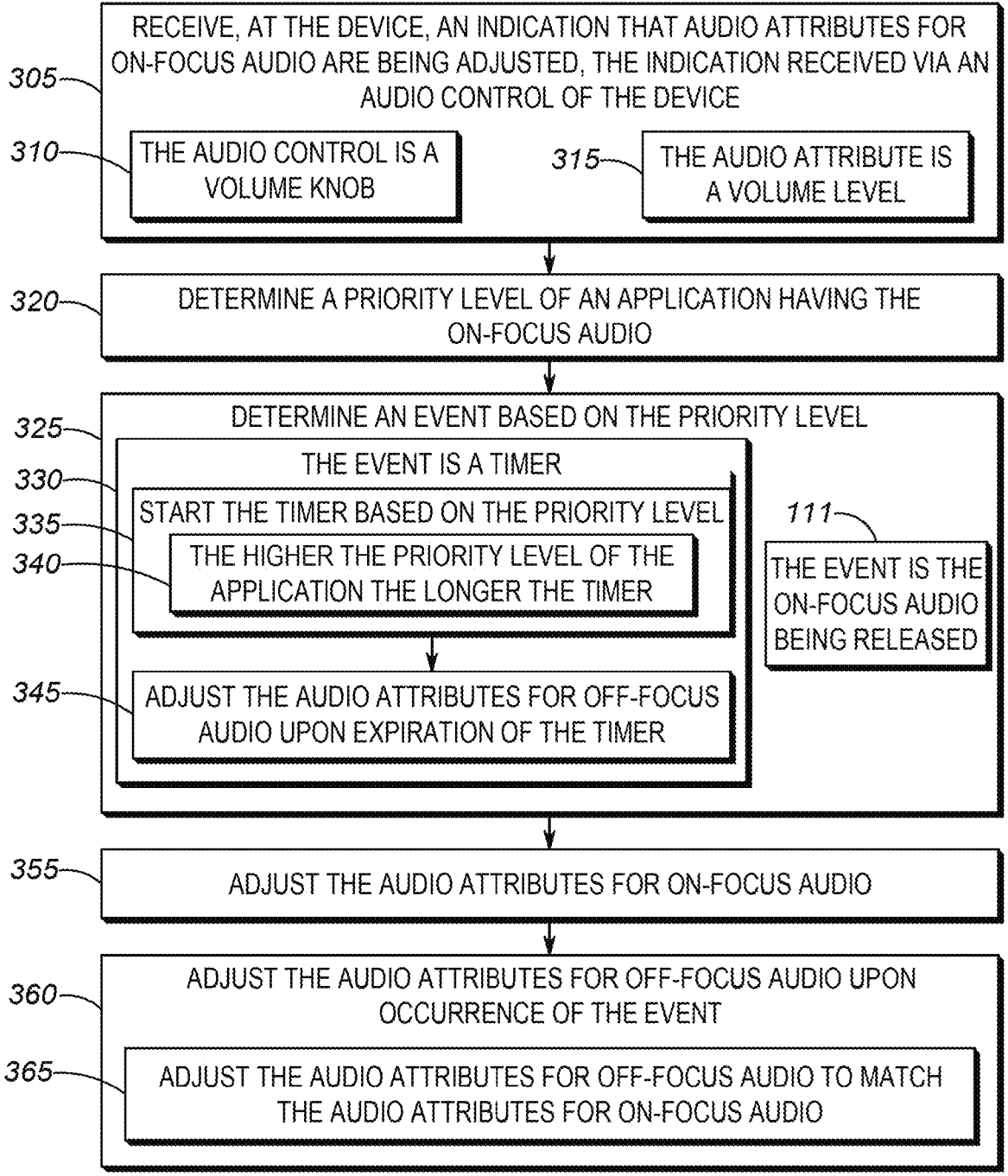
FIG. 3 is an example of a flow chart for adjusting audio attributes for off-focus audio of a device according to the techniques described herein.

FIG. 3 is an example of a flow chart 300 for adjusting audio attributes for off-focus audio of a device according to the techniques described herein. In block 305, an indication that audio attributes for on-focus audio are being adjusted may be received at the device. The indication may be received via an audio control of the device. The audio attribute is not limited to any particular type of attribute and the audio control is not limited to any particular type of form factor.

In block 310, one example of an audio control is a volume knob. The volume knob may be of a type that can be rotated to adjust the volume of the on-focus audio, and subsequently the off-focus audio. Other types of volume control could include buttons that may be pressed. In some implementations, the audio control may be a voice control such as that utilized by virtual digital assistants (e.g. Alexa™, etc.).

In block 315, the audio attribute may be a volume level. As explained above, the problem described herein results from multiple system calls to change audio attributes occurring at the same time. Although volume is the most prevalent attribute, the techniques described herein may be utilized with other attributes as well. For example, audio quality (e.g. bass, treble, etc.), audio fader for stereo speakers, etc. The techniques described herein are not limited to audio volume only, and are applicable anywhere it is described to reduce the number of system calls related to audio occurring in close proximity to one another.

In block 320, a priority level of an application having the on-focus audio is determined. As explained above, there is a tradeoff between keeping the audio settings of the on-focus and off-focus audio in sync and preventing the device from freezing based too many system calls being used to achieve the aforementioned syncing. The higher priority of the application with the current on-focus audio, the more desirable it is to prevent the freezing of the device at the expense of it taking longer for all the audio levels to sync up.

In block 325, an event is determined based on the priority level. The event is the trigger that determines when the audio settings for the off-focus audio are synced with the on-focus audio. The techniques described herein are not limited to any particular event.

Block 330 describes one possible event which is the use of a timer. In block 335, a timer is started based on the priority level of the current on-focus audio application. For example, when the audio control is adjusted, a timer whose length is dependent on the priority level of the on-focus audio application is started. In block 340, it is shown that the higher the priority of the application, the longer the timer. The reason for this being that for high priority applications it is preferable that the application not be interrupted, even if this comes at the expense of it taking longer for off-focus audio settings to sync to the on-focus audio settings.

In block 345, the audio attributes for off-focus audio are adjusted upon expiration of the timer. As described above, including the timer allows the system calls for updating the audio settings for on-focus audio to be separated from the setting the audio settings of off-focus audio. This separation allows for preventing excessive numbers of audio settings update system calls from being received at substantially the same time.

In block 350, the event is the on-focus audio being released. If the application currently having the on-focus audio releases the on-focus, there is not a concern that updating the off-focus audio to sync with the audio control setting will cause the device to freeze temporarily. If the on-focus audio application has released the audio, this means that a temporary device freeze will not affect that application, as it is not currently running. Although two types of events have been described, it should be understood that the techniques described herein are not so limited. Other events could include a periodic event with a defined period or a manual user sync request.

In block 355, the audio attributes are adjusted for the on-focus audio. As described above, the techniques described herein are for purposes of syncing off-focus audio with the current audio control settings. This is done in such a way as to not affect the current on-focus audio. Thus, the on-focus audio settings are adjusted immediately upon the audio control being adjusted.

In block 360, the audio attributes for off-focus audio are adjusted upon occurrence of the event. For example, if the event is a timer, upon expiration of the timer, the off-focus audio settings are adjusted. If the event is the on-focus audio being released, the settings are updated upon release. In block 365, the audio attributes for off-focus audio are adjusted to match the audio attributes for the on-focus audio. As described above, in some applications, it is desirable to keep the audio settings for all audio outputs to be the same. Adjusting the audio settings of all off-focus audio to match the on-focus audio achieves this goal.

Although events are described such as timers and the on focus audio being released, other techniques could also be utilized. For example, different priority threads for the different audio types could be assigned. The off-focus audio settings may be adjusted based on when the thread is scheduled to run. What should be understood is that any technique used to stagger and/or eliminate system calls to adjust off-focus audio settings could be utilized with the techniques described herein.

Figure 4:
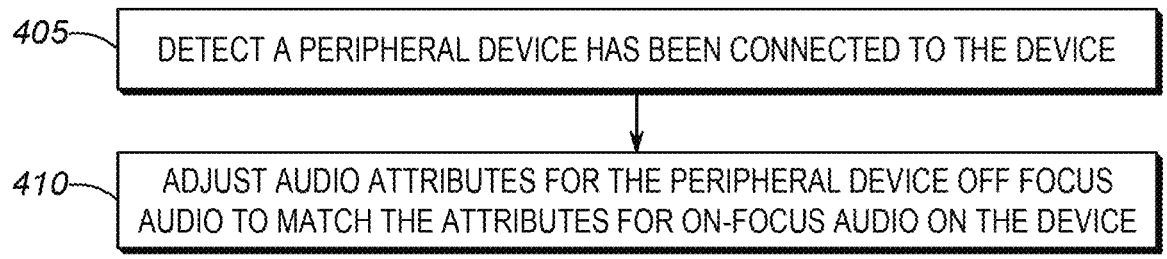
FIG. 4 is an example of a flow chart for adjusting audio attributes when a peripheral device is attached to a device.

FIG. 4 is an example of a flow chart for adjusting audio attributes when a peripheral device is attached to a device. In block 405, it is detected that a peripheral device has been connected to the device. The peripheral device could be a wired or wireless speaker, headset, or any other such device. What should be understood is that the peripheral device may include functionality that provides audio output. For example, the peripheral device includes a speaker.

In block 410, the audio attributes for the peripheral device off-focus audio is adjusted to match the attributes for on-focus audio on the device. Thus, the audio settings for off focus audio on the newly added peripheral device will match those of the on-focus audio.

FIG. 5 is an example of a device 500 that may implement the adjusting audio attributes for off-focus audio of a device according to the techniques described herein. The communication device 500 may be, for example, embodied in a device such as a smartphone, a purpose built communications device, a tablet, a phablet, or any other type of suitable device. In some cases, any device utilizing an operating system, such as the Android™ operating system, are suitable for use with the techniques described herein.

While FIG. 5 represents a device 500 suitable for use with the techniques described herein, depending on the type of the communication device, the communication device 500 may include fewer or additional components in configurations different from that illustrated in FIG. 5. For example, in some embodiments, communication device 500 is a ruggedized purpose built device that may not include a display screen 505. In some embodiments, the communications device may include input controls 506 to adjust audio attributes. Those input controls may be buttons or a rotatable knob.

As shown in FIG. 5, communication device 500 includes a communications unit 502 coupled to a common data and address bus 517 of a processing unit 503. The communication device 500 may also include one or more input devices (e.g., keypad, pointing device, touch-sensitive surface, rotatable knobs, etc.) 506 and an electronic display screen 505 (which, in some embodiments, may be a touch screen and thus also act as an input device 506), each coupled to be in communication with the processing unit 503.

The microphone 520 may be present for capturing audio from a user and/or other environmental or background audio that is further processed by processing unit 503 in accordance with the remainder of this disclosure and/or is transmitted as voice or audio stream data, or as acoustical environment indications, by communications unit 502 to other portable radios and/or other communication devices. The imaging device 521 may provide video (still or moving images) of an area in a field of view of the communication device 500 for further processing by the processing unit 503 and/or for further transmission by the communications unit 502. A speaker 522 may be present for reproducing audio that is decoded from voice or audio streams of calls received via the communications unit 502 from other portable radios, from digital audio stored at the communication device 500, from other ad-hoc or direct mode devices, and/or from an infrastructure RAN device, or may playback alert tones or other types of pre-recorded audio. The speaker 22 as shown is intended to represent any device coupled to the communications device 200 that can produce audio. Such devices may include an integrated speaker, a wired headset, a wireless headset, a wired external speaker, a wireless external speaker, or any other device capable of producing audio. For each speaker 222 there will be multiple entries in a table, such as Table 1, which indicates the audio settings for that speaker for each audio output type (e.g. call, media, ringtone, alarm, etc.).

The processing unit 503 may include a code Read Only Memory (ROM) 512 coupled to the common data and address bus 517 for storing data for initializing system components. The processing unit 503 may further include an electronic processor 513 (for example, a microprocessor or another electronic device) coupled, by the common data and address bus 517, to a Random Access Memory (RAM) 504 and a static memory 516.

The communications unit 502 may include one or more wired and/or wireless input/output (I/O) interfaces 509 that are configurable to communicate with other communication devices.

For example, the communications unit 502 may include one or more wireless transceivers 508, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 502 may additionally or alternatively include one or more wireline transceivers 508, such as an Ethernet transceiver, a USB transceiver, or similar transceiver configurable to communicate via a twisted pair wire, a coaxial cable, a fiber-optic link, or a similar physical connection to a wireline network. The transceiver 508 is also coupled to a combined modulator/demodulator 510.

The electronic processor 513 has ports for coupling to the display screen 505, the input device 506, the microphone 520, the imaging device 521, and/or the speaker 522. Static memory 516 may store operating code 525 for the electronic processor 513 that, when executed, performs one or more of the steps set forth in FIGS. 3 and 4 and accompanying text.

The static memory 516 may comprise, for example, a hard-disk drive (HDD), an optical disk drive such as a compact disk (CD) drive or digital versatile disk (DVD) drive, a solid state drive (SSD), a flash memory drive, or a tape drive, and the like.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot make system calls into the operating system of a communications device, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . aa", "has . . . aa", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of adjusting audio attributes for off-focus audio of a device comprising:
   receiving, at the device, an indication that audio attributes for on-focus audio are being adjusted, the indication received via an audio control of the device;
   determining a priority level of an application having the on-focus audio;
   determining an event based on the priority level;
   adjusting the audio attributes for on-focus audio; and
   adjusting the audio attributes for off-focus audio upon occurrence of the event, wherein the event is a timer further comprising:
   starting the timer based on the priority level, wherein the higher the priority level of the application the longer the timer; and
   adjusting the audio attributes for off-focus audio upon expiration of the timer.

2. The method of claim 1 wherein the audio control is a volume knob.

3. The method of claim 1 wherein the audio attribute is a volume level.

4. The method of claim 1 wherein the event is the on-focus audio being released.

5. The method of claim 1 wherein adjusting the audio attributes for off-focus audio further comprises:
   adjusting the audio attributes for off-focus audio to match the audio attributes for on-focus audio.

6. The method of claim 1 further comprising:
   detecting a peripheral device has been connected to the device; and
   adjusting audio attributes for the peripheral device off focus audio to match the attributes for on-focus audio on the device.

7. A system for adjusting audio attributes for off-focus audio of a device comprising:
a processor; and
a memory coupled to the processor, the memory containing a set of instructions thereon that when executed by the processor cause the processor to:
receive, at the device, an indication that audio attributes for on-focus audio are being adjusted, the indication received via an audio control of the device;
determine a priority level of an application having the on-focus audio;
determine an event based on the priority level;
adjust the audio attributes for on-focus audio; and
adjust the audio attributes for off-focus audio upon occurrence of the event, wherein the event is a timer further comprising instructions to:
start the timer based on the priority level, wherein the higher the priority level of the application the longer the timer; and
adjust the audio attributes for off-focus audio upon expiration of the timer.

8. The system of claim 7 wherein the audio control is a volume knob.

9. The system of claim 7 wherein the event is the on-focus audio being released.

10. The system of claim 7 wherein adjusting the audio attributes for off-focus audio further comprises instructions to:
adjust the audio attributes for off-focus audio to match the audio attributes for on-focus audio.

11. A non-transitory processor readable medium containing a set of instructions thereon for adjusting audio attributes for off-focus audio of a device that when executed by a processor cause the processor to:
receive, at the device, an indication that audio attributes for on-focus audio are being adjusted, the indication received via an audio control of the device;
determine a priority level of an application having the on-focus audio;
determine an event based on the priority level;
adjust the audio attributes for on-focus audio; and
adjust the audio attributes for off-focus audio upon occurrence of the event, wherein the event is a timer further comprising instructions to:
start the timer based on the priority level, wherein the higher the priority level of the application the longer the timer; and
adjust the audio attributes for off-focus audio upon expiration of the timer.

12. The non-transitory processor readable medium of claim 11 wherein the audio control is a volume knob.

13. The non-transitory processor readable medium of claim 11 wherein the event is the on-focus audio being released.

14. The non-transitory processor readable medium of claim 11 wherein adjusting the audio attributes for off-focus audio further comprises instructions to:
adjust the audio attributes for off-focus audio to match the audio attributes for on-focus audio.

* * * * *